No. 697,646. Patented Apr. 15, 1902.
C. D. MOSHER.
MOTOR VEHICLE.
(Application filed Aug. 11, 1900.)
(No Model.) 2 Sheets—Sheet 1.

WITNESSES: INVENTOR:
Charles D. Mosher
by Wright, Brown & Quinby
Attys.

No. 697,646. Patented Apr. 15, 1902.
C. D. MOSHER.
MOTOR VEHICLE.
(Application filed Aug. 11, 1900.)

(No Model.) 2 Sheets—Sheet 2.

UNITED STATES PATENT OFFICE.

CHARLES D. MOSHER, OF NEW YORK, N. Y.

MOTOR-VEHICLE.

SPECIFICATION forming part of Letters Patent No. 697,646, dated April 15, 1902.

Application filed August 11, 1900. Serial No. 26,577. (No model.)

*To all whom it may concern:*

Be it known that I, CHARLES D. MOSHER, of New York, in the county of New York and State of New York, have invented certain new and useful Improvements in Motor-Vehicles, of which the following is a specification.

This invention relates to motor-driven vehicles or automobiles for road use; and it has for its object to provide such improvements in the connections between the vehicle-body and the wheels as will tend to lighten and simplify the vehicle, reduce its cost, increase the protection afforded to the motor parts, and resist the running strains to better advantage than heretofore.

A further object of the invention is to introduce an air-supply into the vehicle-body for cooling the motor or other purpose and to remove dust or other foreign matter from said air-supply.

Figure 1:
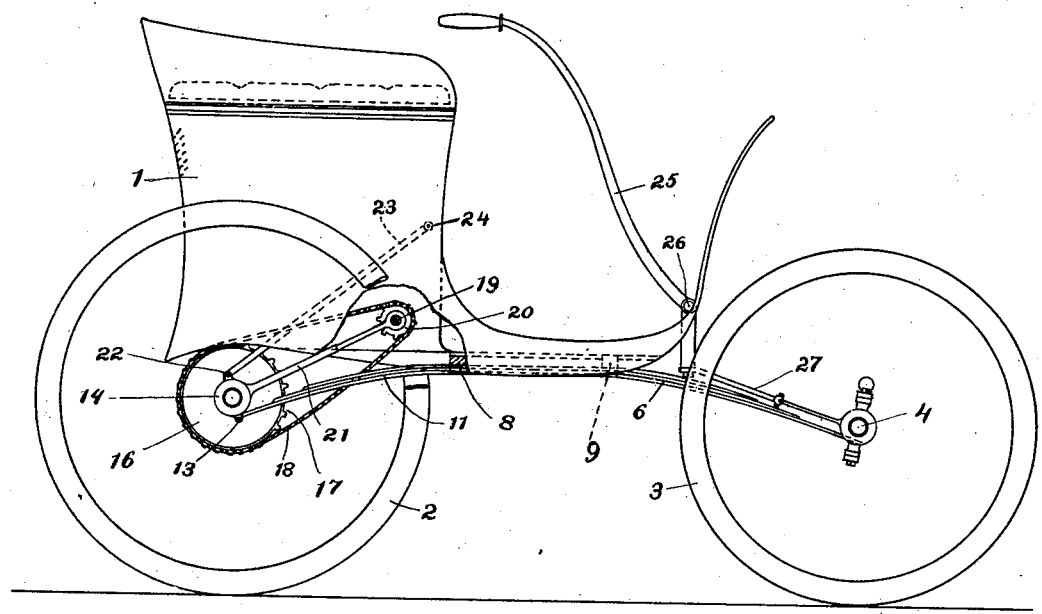
Figure 2:
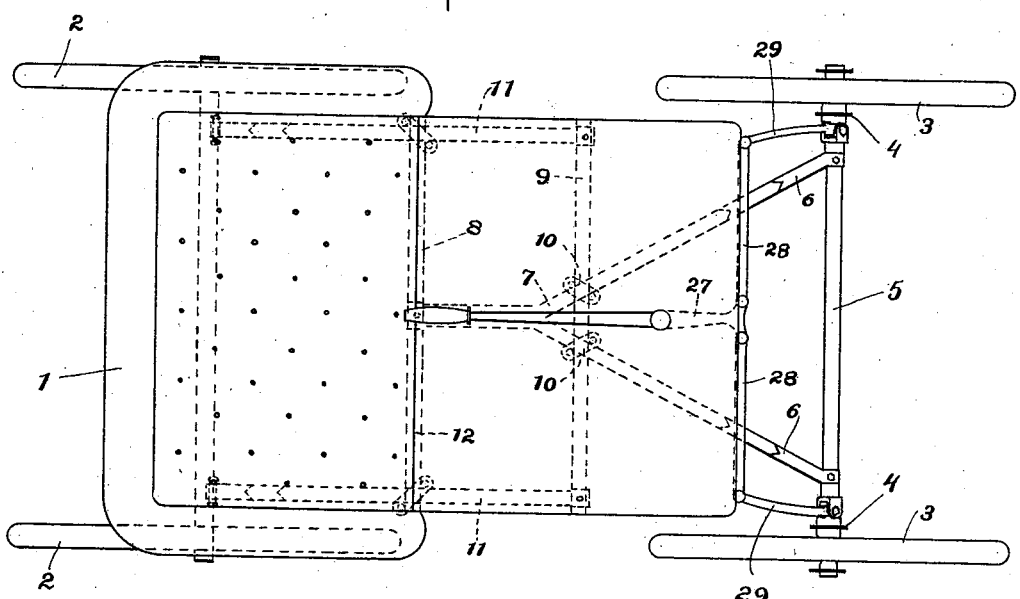
Figures 3, 4:
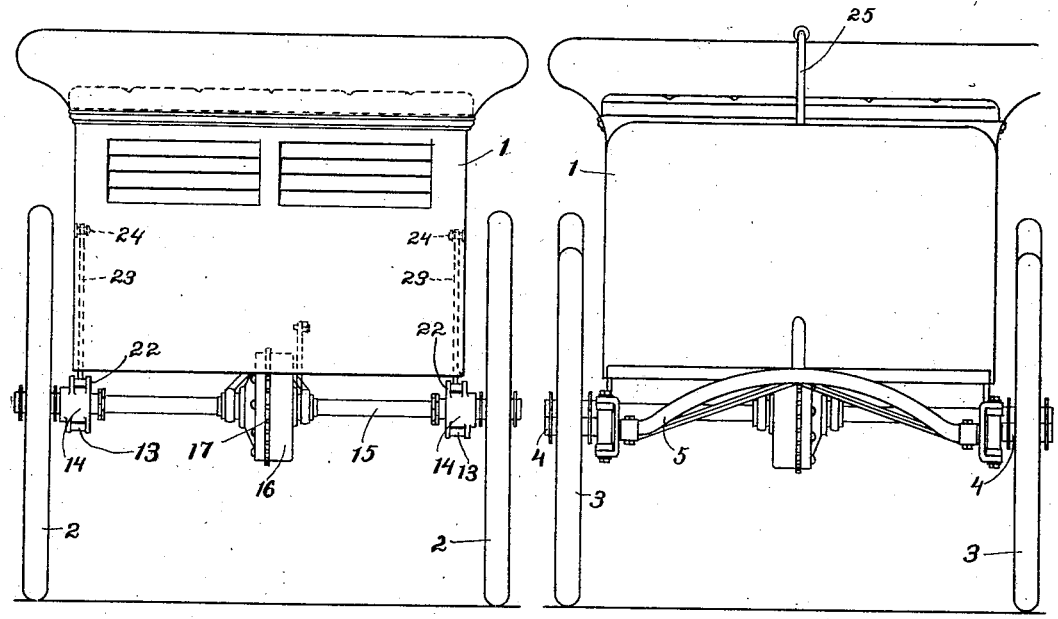
Figure 5:
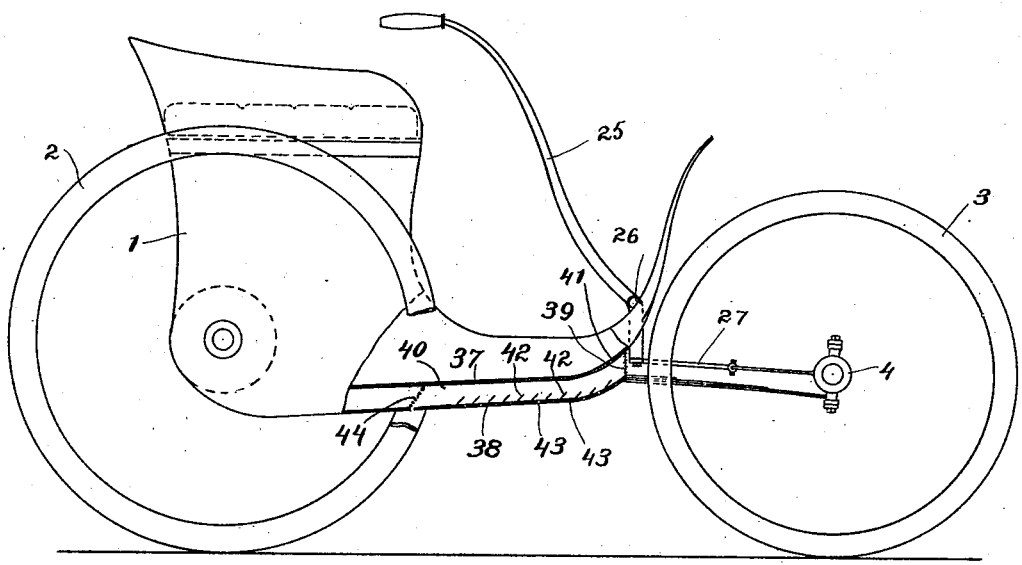

Of the accompanying drawings, Figure 1 represents a side elevation of a motor-vehicle constructed in accordance with my invention. Fig. 2 represents a plan view thereof. Fig. 3 represents a rear elevation. Fig. 4 represents a front elevation. Fig. 5 represents a side elevation showing a modified form of body construction.

The same reference characters indicate the same parts in all the figures.

In the drawings, 1 designates the body of the vehicle.

2 2 designate the rear wheels, and 3 3 designate the front or steering wheels. The latter are mounted upon separate short axles 4 4, pivoted or swiveled to the ends of a cross-bar 5, connected by springs 6 6 to the vehicle-body 1. Said springs are in accordance with my present invention arranged in divergent or V form, with their forward ends connected to the cross-bar 5 close to the wheel-swivels and their rear ends permissibly connected together, as at 7, and attached to a cross-sill 8, forming a part of the framing of the vehicle. At a point in front of the location of said cross-sill is a second sill 9, forming part of the body-frame, to which sill the springs 6 6 are also shown as attached by means of suitable clamps 10 10. The locality of the bar 9 is the foremost point at which the body rests upon the springs 6. The divergent or V arrangement of the springs 6 gives turning room for the steering-wheels 3 3 and at the same time enables the points of attachment of the springs to the cross-bar 5 to be brought close to the wheels, thus insuring stability and strength. The springs being longitudinally disposed and occupying a substantially horizontal position when the carriage is occupied are in the best position to resist horizontal thrust transmitted from the front wheels when the vehicle is running. Being diagonally disposed, the springs are also in the best position to resist the twisting strain imparted when one wheel encounters an obstruction not encountered by the other, and withal it will be noted that each wheel is perfectly free to become displaced vertically independent of the other wheel.

The rear wheels 2 2 are connected by springs 11 11, permissibly similar in construction to the springs 6, with the vehicle-body 1. Instead of being divergent in arrangement, however, these springs 11 are preferably parallel and located near the sides of the vehicle-body. They preferably have two points of attachment to the vehicle-body, the rear point being, as here shown, on the cross-sill 8 of the carriage-frame and the front point being on the cross-sill 9. The rear ends of the springs 11 are shown as pivoted at 13 13 to suitable collars or enlargements 14 14 on the rear-axle housing 15 close to the wheels 2 2.

16 represents the usual differential or compensating gear associated with the rear axle and having a sprocket-wheel 17 on its periphery, which connects by a chain 18 with a motor carried by the body 1 of the vehicle. Said motor may be of any desired type and is not herein shown. The shaft 19 of the motor is shown, said shaft having a sprocket-wheel 20, with which the chain 18 meshes. The power of the motor-shaft 19 is thereby transmitted to the axle of the driving-wheels 2 in a familiar manner.

21 represents a spacing-bar or radius-bar interposed between the motor-shaft 19 and the axle-housing 15 and preserving at all times a uniform distance between the shaft and axle. The pivotal points 13 of connection between the springs 11 and collars 14 are shown as located on the under sides of said collars. Pivoted at 22 to the upper sides of said collars are two arms 23 23, extending diagonally upward and pivoted at 24 24 to the framing of the vehicle-body 1. The arms 23 and springs 11 are so related that during movement of their rear ends with respect to the vehicle-body the axle is carried in a mean path which corresponds substantially to that of the rear end of radius-bar 21. The correspondence is not exact, but is so nearly so in the small arcs through which movement takes place that the movement occurs without any binding whatever. This novel construction enables me to bring the motor well within the vehicle-body 1, and thus protect it, besides rendering the vehicle more sightly and more compact. The springs 11 and pivotal arms 23 take practically all the strains occurring between the body and wheels and at the same time afford a light, simple, and perfectly strong construction. The springs 6 and 11 are bar-springs, preferably built up in the ordinary manner. By their use and disposition substantially in the manner specified I am enabled to dispense entirely with connecting braces or framing between the axles, and thus to decrease cost and provide a light vehicle.

25 represents a steering-lever pivoted to a vertical shaft 26, which turns in a fixed bearing on the carriage-body and is provided at its lower end with an arm 27, which is connected by links 28 28 with arms 29 on the steering-wheel axles. The joints between links 28 and arms 27 and 29 may be universal or ball joints. This form of steering mechanism is of familiar construction, and I may substitute any other desired mechanism.

Fig. 5 shows an improved construction of the vehicle-body 1 for carrying an air-supply to the motor, said air-supply being desirable in certain forms of motor for cooling or other purposes. 37 represents a false floor built horizontally along the lower side of the vehicle-body 1, and 38 represents the bottom of said vehicle-body, arranged below said false floor. Between the floor 37 and bottom 38 is a longitudinal space or air-box, which communicates at its rear end with the main interior space of the vehicle-body containing the motor, and at its front end is provided with an opening or openings, which may consist of apertures formed in a front wall 39. The said apertured wall extends horizontally across the front of the vehicle-body at the base of the dashboard and is adapted to admit air to the air space or box 40. The floor 37, forming the upper wall of the air-box 40, takes an upward curve or slant near its forward end, forming an inclined deflecting-wall 41 just back of the perforated front wall 39, against which the entering air impinges and which deflects the current of air downwardly. The bottom 38, forming the lower wall of the air-box 40, is provided on its upper side with a number of transverse forwardly-inclined slats or plates 42 42, which make an acute angle with the bottom 38. These slats only partially fill the vertical height of the air-box, and their purpose is to form pockets to catch the dust or other foreign matter which may enter with the air into the air-box. At the junction of the slats with the bottom 38 perforations 43 may be formed in said bottom to permit of the escape of said dust or foreign matter. The heavier particles of dust will naturally fall by gravity against the slats 42 and will lodge in the pockets. This tendency of the dust to so lodge is increased by the deflecting-wall 41, which directs the current of air downwardly toward the pockets. In traversing the air-box 40 some of the current of air will escape through the perforations 43, and that part which passes onto the rear end of the box will be to a large extent rid of any dust which it may carry. To further sift the air, a screen or strainer 44 of fine-mesh material, such as cotton-batting, may be stretched across the air-box 40 at or near its rear end.

I claim—

1. In a motor-vehicle, the combination with the vehicle-body, of a wheel and a cross connection therefrom, a substantially straight bar-spring extending longitudinally of the vehicle and attached at its inner end to said vehicle-body and at its outer end to said cross connection, whereby the vehicle-body is yieldingly supported, and a longitudinal thrust-bar pivoted at its inner end to the vehicle-body and its outer end to said connection.

2. In a motor-vehicle, the combination with the vehicle-body, and the cross-frame to the ends of which the steering-wheel axles are swiveled, of a pair of substantially straight bar-springs attached at their inner ends to the vehicle-body and at their outer ends to the said cross-frame at or near the ends of the latter, said springs being arranged longitudinally of the carriage in a substantially horizontal manner, and converging inwardly or toward their point of attachment to the vehicle-body to permit a substantial amount of turning movement to the steering-wheels.

3. In a motor-vehicle, the combination with the vehicle-body, and the cross-frame to the ends of which the front-wheel axles are swiveled, of a pair of substantially straight bar-springs attached at their rear ends to the vehicle-body and at their front ends to the said cross-frame at or near the ends of the latter, said springs being arranged longitudinally of the carriage in a substantially horizontal manner, and converging rearwardly to permit a substantial amount of turning movement to the front wheels, and to resist twisting thrust of said wheels, as set forth.

4. In a motor-vehicle, the combination with the vehicle-body, of a driving-wheel and its axle, a motor-shaft journaled within the vehicle-body, a driving connection between said motor-shaft and driving-wheel, a radius-bar interposed between said motor-shaft and axle, and a substantially straight bar-spring having an inner point of attachment to the vehicle-body and an outer point of attachment to the axle, said outer point being horizontally and longitudinally remote from said inner point.

5. In a motor-vehicle, the combination with the vehicle-body, of a driving-wheel and its axle, a motor-shaft journaled on the vehicle-body in an elevated position with respect to said axle, a driving connection between said motor-shaft and wheel, and a yielding supporting and thrust connection between the vehicle-body and wheel-axle extending longitudinally of the vehicle and comprising a bar-spring and a pivotal arm connected to the vehicle-body, respectively below and above the motor-shaft, and connected to the wheel-axle below and above the latter.

6. In a motor-vehicle, the combination with the vehicle-body, of a driving-wheel and its axle, a motor-shaft journaled on the vehicle-body in an elevated position with respect to said axle, a driving connection between said motor-shaft and driving-wheel, a radius-bar interposed between said motor-shaft and axle, a longitudinally-extending arm connected pivotally to the axle on the upper side thereof, and to the vehicle-body above the motor-shaft, and a longitudinally-extending bar-spring pivotally connected to the axle on the under side thereof and attached to the vehicle-body below the motor-shaft.

7. In a motor-vehicle, the combination with the vehicle-body, of the driving-wheels and their connecting-axle, a motor-shaft journaled on the vehicle-body in an elevated position with respect to said axle, a driving connection between said motor-shaft and wheels, a radius-bar interposed between said motor-shaft and axle, a pair of longitudinally-extending bar-springs attached at their inner ends to the vehicle-body below the motor-shaft, and pivotally connected to the axle on the under side thereof, and a pair of longitudinally-extending arms connected pivotally at their inner ends to the vehicle-body above the motor, and at their outer ends to the axle on the upper side thereof.

In testimony whereof I have affixed my signature in presence of two witnesses.

CHARLES D. MOSHER.

Witnesses:
  P. W. PEZZETTI,
  A. D. HARRISON.